June 12, 1956  A. J. MATTEOLI  2,749,822
PLANT THINNER

Filed Sept. 22, 1953  3 Sheets-Sheet 1

INVENTOR
Albert J. Matteoli
BY
ATTYS

June 12, 1956  A. J. MATTEOLI  2,749,822
PLANT THINNER
Filed Sept. 22, 1953  3 Sheets-Sheet 2
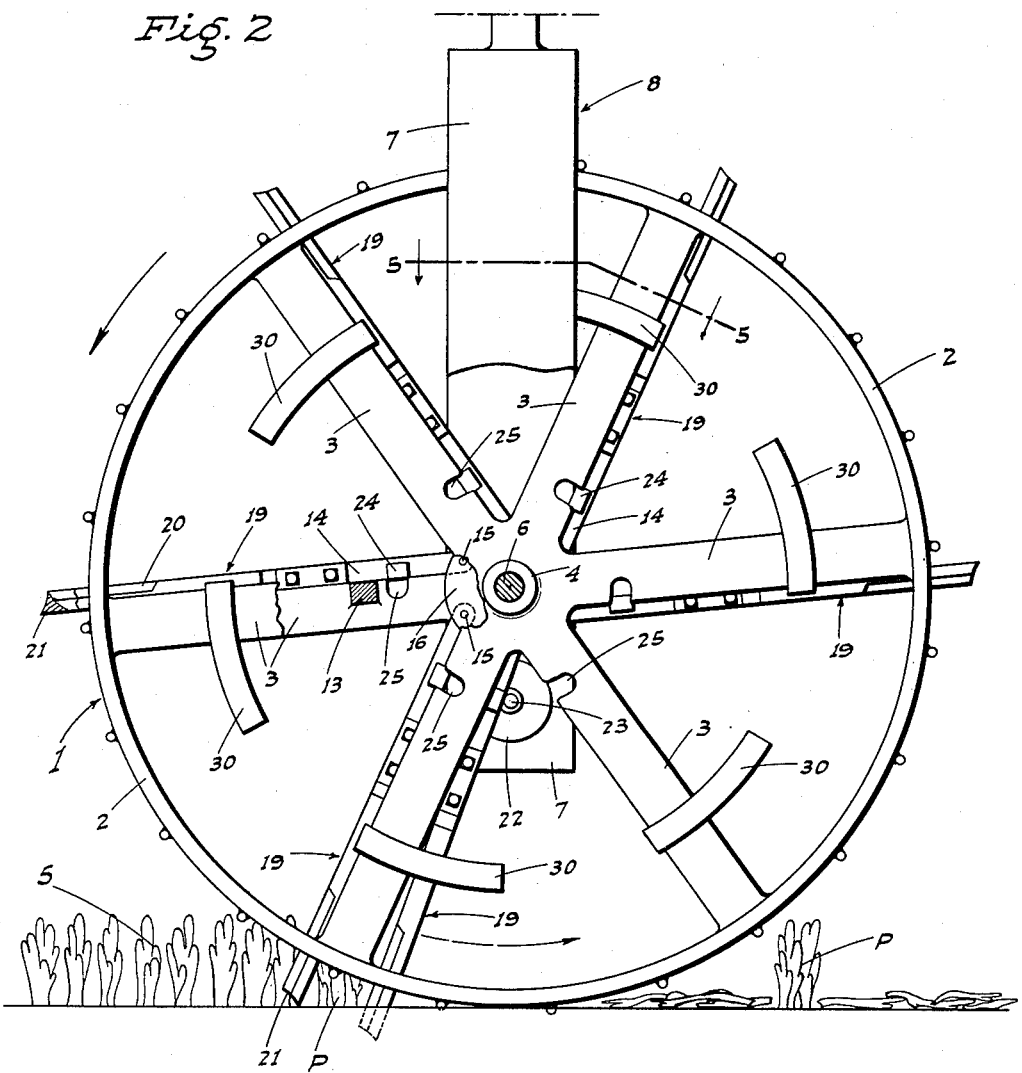
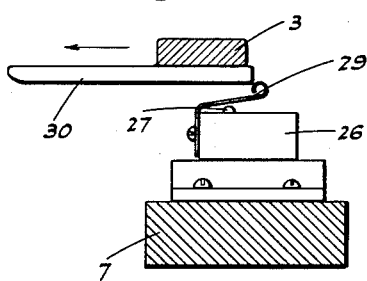
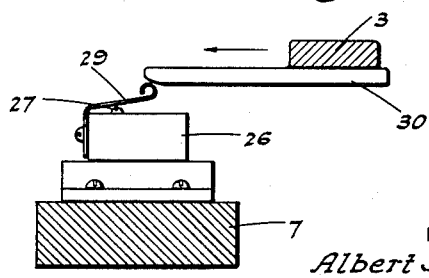
INVENTOR
*Albert J. Matteoli*
BY
*Webster & Webster*
ATTYS June 12, 1956

A. J. MATTEOLI 2,749,822

PLANT THINNER

Filed Sept. 22, 1953

INVENTOR
Albert J. Matteoli
BY
ATTYS

United States Patent Office 2,749,822
Patented June 12, 1956

2,749,822

PLANT THINNER

Albert J. Matteoli, Sacramento, Calif.

Application September 22, 1953, Serial No. 381,655

15 Claims. (Cl. 97—22)

This invention relates to plant thinning devices; the major object of my invention being to provide a novel wheel-type thinning device by means of which spaced stretches of ground along a row of plants are intermittently dug up or disturbed and the plants therein uprooted, while the plants between such stretches are left in an upstanding and untouched condition. An important feature of my improved device is that the digging or plant uprooting operation takes place in a direction lengthwise of the row, so that no dirt or plants tend to be thrown laterally and onto an adjacent row, as is the case with certain previous thinning devices.

A further object is to provide a thinning wheel unit for the purpose so constructed that a number of successive ground digging and thinning operations are performed for each complete revolution of the wheel unit.

An additional object of the invention is to provide a wheel unit for the purpose which includes a number of separate and relatively movable thinning members, each in succession of which is adapted to be held substantially against rotation with the wheel as the latter rotates for a predetermined period of arcuate rotation of said wheel, so as to then perform a thinning operation, and a single electrically controlled device automatically and successively functioning to maintain each member in turn in its thinning position.

It is also an object of the invention to provide a practical and reliable plant thinner, and one which will be exceedingly effective for the purpose for which it is designed.

These objects are accomplished by means of such structure and relative arrangement of parts as will fully appear by a perusal of the following specification and claims.

In the drawings:

Fig. 2 is a similar view, but partly broken away and in section, and showing the unit at the completion of a thinning operation.

Fig. 4 is a fragmentary enlarged sectional plan on line 4—4 of Fig. 1.

Fig. 5 is a similar view on line 5—5 of Fig. 2.

Figure 1:
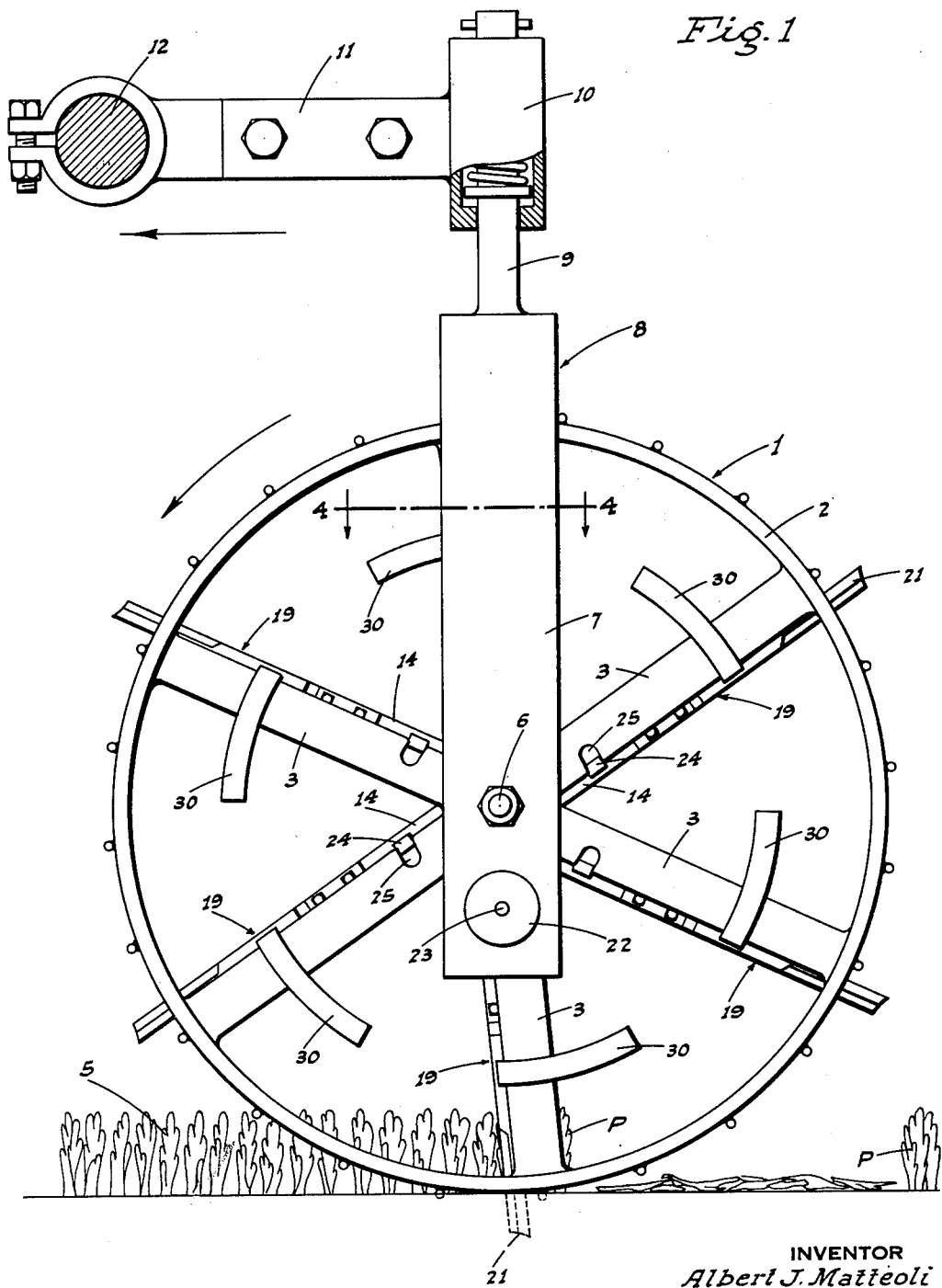
Fig. 1 is a side elevation of the plant thinning wheel unit at the start of a thinning operation.
Figure 3:
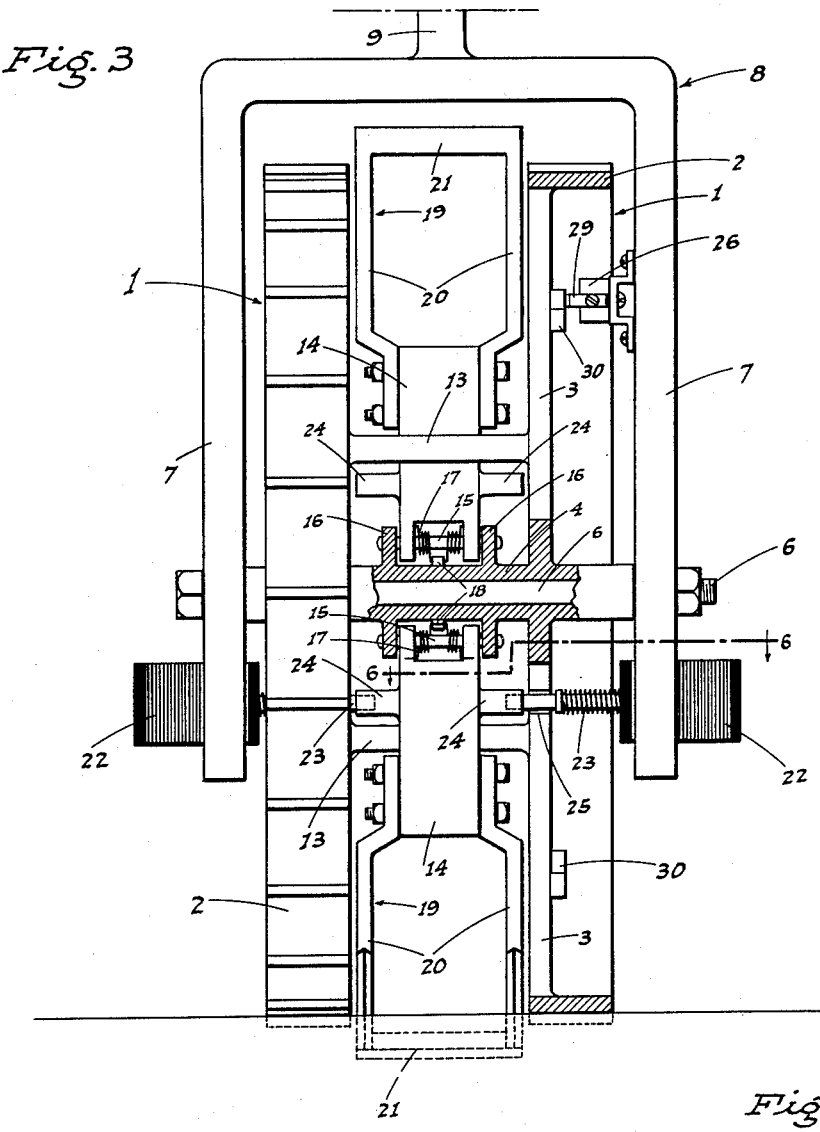
Fig. 3 is an end view of the unit, partly broken away and in section, with the parts in the position of Fig. 1.
Figure 6:
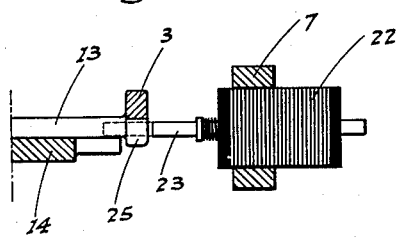
Fig. 6 is a fragmentary sectional plan on line 6—6 of Fig. 3, but showing the locking plunger retracted.

Referring now more particularly to the drawings, and to the characters of reference marked thereon, the thinning unit comprises a pair of wheels 1 including ground engaging and traction rims 2, spokes 3, and a hub 4 common to both wheels and maintaining them transversely spaced a distance sufficient to span or straddle a row of plants 5 to be thinned.

The hub is mounted on an axle 6 supported at its ends in the side arms 7 of a depending yoke 8. At its upper end the yoke is formed with an upstanding stem 9 vertically floatable in a sleeve 10 which is on the outer end of an arm 11 adapted to be clamped to a tractor-mounted tool bar 12 or the like. As the tractor advances, the wheels rotate as a unit, since they are tied together by the hub.

The spokes of each wheel are evenly spaced, and the spokes of the two wheels are disposed in alined parallel relationship, each pair of spokes being tied together intermediate their ends by a cross bar 13, preferably disposed adjacent the forward or leading edge of the spokes. Disposed between each pair of spokes ahead of the cross bar 13 is a plant thinning unit which includes an arm 14 pivoted at its inner end on a cross pin 15 mounted in ears or flanges 16 projecting from hub 4. The arm 14 is normally but yieldably held against the stop-forming cross bar 13 by a torque spring 17 about pin 15 and connected between the arm and a lug 18 on the hub 4; the arm being then substantially parallel to the corresponding spokes. The arm is relatively short compared to the spokes, and rigidly but removably connected thereto and projecting as an extension thereof is a ground cutting and plant thinning member 19 comprising spaced side arms 20 connected at their outer end by a transverse blade 21 of suitable form in cross section, as shown, and sharpened along its leading edge, as are the leading edges of the lower portions of arms 20. The length of arms 20 is such that blade 21 is normally disposed beyond the periphery of the wheel rims 2, or below ground level, sufficient to uproot any plants in the path of the blade when the latter is dragged through the ground.

The thinning unit is held relatively stationary, upon rotation of the wheel unit and advance of the same along the ground, during an arcuate movement of the wheels, somewhat less than the arcuate spacing between adjacent spokes (and thinning units) at the rim of the wheels, by the following means:

Mounted in the yoke arms 7 adjacent their lower end are opposed axially alined solenoid coils 22 having spring-advanced plungers 23 arranged, when advanced, in a direction toward each other, to project past the path of the spokes 3 and behind lugs 24 rigid with each of the arms 14. Since said arms when engaged with the corresponding cross bars 13 are somewhat back of the leading edges of the adjacent spokes, said edges of the spokes are notched, as at 25, in the path of the plungers 23.

Figure 7:
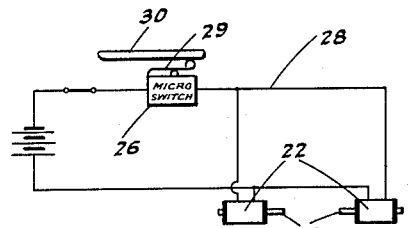
Fig. 7 is a diagram of the plunger-retracting circuit.

As previously stated, the solenoid plungers are spring-advanced, which is when the solenoids are deenergized, and in order to maintain the solenoids energized, except when each spoke unit—and the adjacent thinning member—are in a substantially vertical depending position, as shown in Fig. 1, and until the succeeding spoke unit approaches such depending position, the following arrangement is provided:

Fixed on the inner face of one of the yoke arms 7 above the center of the wheel unit is a micro-switch 26, whose actuating button 27 faces laterally inward (see Figs. 4 and 5). This switch is normally open—when the button is advanced—and is interposed in a circuit 28 in which the solenoids 22 are connected in parallel, as shown in Fig. 7. A spring finger 29 is arranged in connection with the micro-switch in overhanging relation to button 27 in position to be engaged and depressed against said button to depress the same and close the switch, by a circumferentially extending cam 30 fixed on each spoke 3 of the corresponding wheel 1. Each cam is of a length and so positioned that as soon as the thinning member on the opposed spoke unit reaches a fully depending position, as shown in Fig. 1, said cam leaves the spring finger 29, as shown in Fig. 4. This breaks the circuit and deenergizes the solenoids whereupon the plungers 23 instantly advance ahead of the adjacent arm 14, which—up to this time—has been held by spring 17 against cross bar 13.

With continued rotation of the wheel unit and advance of the upstanding supporting yoke 8 along the ground, the lowered and plunger-engaged thinning member is maintained in a substantially rigid and non-rotative position, moving horizontally with the yoke and being dragged through the ground from the point at which the plungers were first projected or advanced ahead of lugs 24, until the thinning member, still engaged with the ground, has been shifted to a position close to the next spoke ahead, as shown in Fig. 2. When the thinning member reaches this position, the cam 30 of the opposed upper spoke corresponding to said next lower spoke, engages the finger 29, causing the micro-switch to be closed, energizing the circuit, and causing the plunger 23 to be instantly retracted.

As soon as the plungers retract, the thinning member sweeps back under the action of the corresponding torque spring 17 to its initial abutting position against the cross bar 13 of the corresponding spoke unit, which has of course since rotated to an angular position back to the yoke, and the thinning member, when regaining its initial position relative to said spoke unit, will then be well clear of the ground and of a single plant P left by the previous thinning movement.

The arcuate space left between the held thinning member just before it is released, and the next thinning member associated with said next spoke unit, is sufficient to dispose one plant P of the row 5 therebetween. Such plant then remains undisturbed in the ground immediately behind said next thinning member, which remains close against the cross bar 13 of the corresponding spokes 3 as the latter turn down with the rotation of the wheels and merely cuts down into the ground in the manner of a cleat without disturbing any of the plants in the row ahead of said one plant P. Then, as soon as said member reaches its fully depressed position, the switch 26 again becomes opened by the movement of the corresponding cam 30 to a position clear of spring 29, and the solenoid plungers then move behind said thinning member, and the latter starts on the next ground shoveling or scraping and plant thinning operation.

The spring action is used to advance the solenoid plungers rather than the reverse, since with the advance of the plungers nothing resists their advancing movement, whereas when the plungers are to be retracted the lugs 24 are pressing against the plungers, requiring a stronger force to overcome the frictional resistance and pull the plungers back, with the desired sharp and sudden action, than the springs would afford.

While I have here shown and described a single-row thinning unit, it will be obvious that any number of such units, to simultaneously thin a number of plant rows, may be mounted on a single tool bar, and drawn along by a single tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A plant thinner comprising a wheel adapted to travel and rotate alongside a row of plants to be thinned, the wheel including a ground engaging rim, a hub, and equally spaced spokes; an axle for the wheel, a yoke in which the axle is mounted adapted to be supported from a draft device in relatively immovable relation thereto, thinning devices corresponding in number to the spokes transversely pivoted on the hub adjacent the spokes and projecting substantially radially of the wheel, said devices each including a transverse cutting place disposed radially out from the wheel rim, a lateral stop element on each spoke against which the adjacent thinning device normally bears, spring means yieldably holding the device against the stop element to prevent swinging of said device away from said stop element, and means, functioning automatically upon rotation of the wheel and mounted in part on the yoke, to engage each device to prevent rotation thereof with said wheel when in ground engaging position for an arcuate extent of rotation of the wheel less than the arcuate distance between adjacent blades.

2. A plant thinner, as in claim 1, in which said device engaging means includes a plunger mounted on the yoke for movement transversely of the wheel from an advanced position directly in the path of rotation of the thinning device when engaging said stop elements to a retracted position laterally out and clear of said device and the spokes, means to advance the plunger for the duration of said arcuate extent of rotation of the wheel, and means to retract the plunger at the conclusion of each such arcuate extent of rotation.

3. A plant thinner, as in claim 1, in which said device engaging means includes an electric solenoid mounted on the yoke and having a plunger movable transversely of the wheel immediately in the path of rotation of said thinning device.

4. A plant thinner, as in claim 3, with spring means acting on the plunger to so advance the same, a circuit for the solenoid, a normally open switch interposed in the circuit and mounted on the yoke, and means mounted in part on the wheel to close the switch and hold the same closed for the period between each such arcuate extent of rotation of the wheel.

5. A plant thinner, as in claim 4, in which the switch includes a depressible button whose depression opens the circuit, and said last named means comprises a circumferentially extending cam on each spoke, and a button engaging member mounted in connection with the switch and adapted to be engaged and moved by the cam to a button depressing position.

6. A plant thinner, as in claim 1, with another wheel transversely spaced from the first named wheel and rigid with the hub thereof; the wheels being arranged to straddle a row of plants to be thinned and the thinning devices being mounted between the wheels.

7. A plant thinner comprising a support adapted to be mounted for travel above and along a crop row, a wheel journaled on the support for ground engagement alongside said crop row, a thinning device extending radially inward of the wheel from a point adjacent the periphery thereof, means pivoting the device at its inner end on the wheel for relative swinging motion about an axis parallel to that of said wheel, said device including a plant thinning element at its outer end to recurringly enter the crop row below ground level upon rotation of the wheel, means between the support and device to releasably engage and hold the latter against swinging thereof in the direction of rotation of the wheel, and means responsive to wheel rotation to actuate said device engaging means upon the thinning element of the device reaching a dependent position in the crop row, and to release said device engaging means only after predetermined rotation of the wheel subsequent to said thinning element reaching such dependent position.

8. A plant thinner, as in claim 7, with a stop on the wheel to prevent swinging motion of the thinning device in the direction of rotation of the wheel from an initial position relative thereto, and a spring to return the device to said initial position upon its release by said actuating means.

9. A plant thinner, as in claim 7, in which said device engaging means comprises a plunger mounted on the support and movable laterally of the wheel directly in the path of rotation of the thinning device.

10. A plant thinner, as in claim 7, in which said device engaging means comprises a solenoid mounted on the support and including a normally retracted plunger positioned for advancing movement laterally of the wheel directly in the path of rotation of the thinning device.

11. A plant thinner, as in claim 10, in which the actuating means includes, with a circuit in which the solenoid is interposed, a switch in the circuit mounted on the support, the switch being normally closed and the plunger being then retracted, a spring to advance the plunger, and a switch actuating member mounted on the wheel in position to open the switch when the thinning element reaches said dependent position and to hold the switch open, upon rotation of the wheel, for the duration of said predetermined rotation of the wheel.

12. A plant thinner, as in claim 7, with another wheel mounted in spaced axial connection with said first named wheel so that the wheels straddle the crop row, the thinning element being disposed in the space between the wheels.

13. A plant thinner comprising a support adapted to be mounted for travel above and along a crop row, a wheel journaled on the support for ground engagement alongside said crop row, a plurality of thinning devices extending radially inward of the wheel from adjacent the periphery thereof in normally evenly spaced relation circumferentially of the wheel, means pivoting the devices at their inner end for separate relative swinging motion about axes parallel to that of the wheel, each device including a plant thinning element at its outer end to enter the crop row below ground level upon rotation of the wheel, means on the support to releasably engage each device in turn to prevent swinging thereof in the direction of rotation of the wheel, and means arranged to actuate said last named means upon the thinning element of each device reaching a dependent position in the crop row, and to release said last named means only after forward rotation of the wheel a predetermined amount less than the circumferential spacing of adjacent thinning elements.

14. A plant thinner comprising a support adapted to be mounted for travel above and along a crop row, a wheel journaled on the support for ground engagement alongside said crop row, a plurality of thinning devices extending radially inward of the wheel from adjacent the periphery thereof in normally evenly spaced relation circumferentially of the wheel, means pivoting the devices at their inner end for separate relative swinging motion about axes parallel to that of the wheel, each device including a transversely extending cutting blade disposed radially out from the rim of the wheel to enter the crop row below ground level upon rotation of the wheel, stop elements on the wheel for the different thinning devices against which said devices normally bear to prevent swinging of said devices in the direction of rotation of the wheel, spring means yieldably holding the devices against the corresponding stop elements so that the devices will then rotate as a unit with the wheel, and means mounted in part on the support and functioning automatically to engage each device in turn to prevent rotation thereof with the wheel, for an arcuate extent of rotation of the wheel less than the arcuate distance between adjacent blades, from a point at which the blade of said device is in a maximum ground engaging position.

15. A thinner, as in claim 14, in which the last named means includes a plunger mounted in the support for movement transversely of the wheel to a position immediately in the path of rotation of each thinning device from a retracted position clear of said device, means to advance the plunger for the duration of said arcuate extent of rotation of the wheel, and means to retract the plunger at the conclusion of each such arcuate extent of rotation of the wheel.

References Cited in the file of this patent

UNITED STATES PATENTS

| 811,106 | Sutton | Jan. 30, 1906 |
| 927,128 | Delano | July 6, 1909 |
| 2,412,715 | Callahan | Dec. 17, 1946 |